US011187866B2

(12) United States Patent
Sahoo et al.

(10) Patent No.: US 11,187,866 B2
(45) Date of Patent: *Nov. 30, 2021

(54) FIBER MULTITUBE OPTICAL FIBER CABLE

(71) Applicant: Sterlite Technologies Limited, Aurangabad (IN)

(72) Inventors: Kishore Sahoo, Aurangabad (IN); Sravan Kumar, Aurangabad (IN); Kavya Chintada, Aurangabad (IN); Vikash Shukla, Aurangabad (IN); Venkatesh Murthy, Aurangabad (IN); Atul Mishra, Aurangabad (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,156

(22) Filed: Mar. 30, 2020

(65) Prior Publication Data

US 2020/0225435 A1 Jul. 16, 2020

Related U.S. Application Data

(63) Continuation of application No. 16/224,505, filed on Dec. 18, 2018, now Pat. No. 10,641,981.

(51) Int. Cl.
*G02B 6/44* (2006.01)

(52) U.S. Cl.
CPC ......... *G02B 6/4494* (2013.01); *G02B 6/4495* (2013.01)

(58) Field of Classification Search
CPC ..................... G02B 6/4494; G02B 6/4495
USPC ........................................... 385/111
See application file for complete search history.

(56) References Cited

U.S. PATENT DOCUMENTS

| 10,261,278 | B1* | 4/2019 | Murthy | G02B 6/4415 |
|---|---|---|---|---|
| 10,641,981 | B1* | 5/2020 | Sahoo | G02B 6/4494 |
| 2013/0202262 | A1* | 8/2013 | Haymore | G02B 6/4494 |
|  |  |  |  | 385/111 |
| 2017/0068062 | A1* | 3/2017 | Quinn | G02B 6/4494 |
| 2018/0348460 | A1* | 12/2018 | Sahoo | G02B 6/441 |

* cited by examiner

*Primary Examiner* — Jerry M Blevins

(57) ABSTRACT

The present disclosure provides an optical fiber cable. The optical fiber cable includes a central strength member. The central strength member lies substantially along a longitudinal axis of the optical fiber cable. The optical fiber cable includes at least one buffer tube. The at least one buffer tube is stranded helically around the central strength member. Each of the at least one buffer tube encapsulates at least one optical fiber. The optical fiber cable includes a first layer. The first layer circumferentially surrounds a core of the optical fiber cable. The optical fiber cable includes a second layer. The second layer is formed of high density polyethylene. The optical fiber cable includes at least one set of water swellable yarn and a plurality of ripcords.

19 Claims, 2 Drawing Sheets

FIBER MULTITUBE OPTICAL FIBER CABLE

The present disclosure relates to the field of optical fiber cable and, in particular, the present disclosure relates to a multitube optical fiber cable. The present application is a continuation application to co-pending U.S. application Ser. No. 16/224,505 filed on 18 Dec. 2018, the disclosure of which is hereby incorporated by reference herein.

FIELD OF THE INVENTION

Description of the Related Art

Over the last few years, there has been a rapid growth in the use of optical fiber cables. One such type of optical fiber cables are micro duct multi-tube optical fiber cables. These multi-tube optical fiber cables are used for various indoor-outdoor applications. The multi tube optical fiber cables are installed in ducts/microduct. Traditionally, the multi tube optical fiber cables are installed by blowing the optical fiber cable into a duct/microduct while simultaneously pushing the optical cable into the duct. The blowing is done by injecting a high volume of compressed air into the duct which flows inside the duct at high speed. Accordingly, the high speed air propels the optical fiber cable further inside the duct. The optical fiber cable is blown with a cable blowing machine. Typically, the structure of these air blown optical fiber cables includes a number of buffer tubes. The buffer tubes are stranded around a central strength member in an S-Z fashion.

The currently available air blown optical fiber cables have certain drawbacks. The existing air blown optical fiber cables cannot be installed in smaller ducts comparatively due to the large diameter as the fill factor of the duct becomes less compared to the standard values. In addition, the single layer design of the buffer tubes has a higher thickness of the buffer tubes. The higher thickness enables enough crush resistance to resist binder tension during S-Z process and prevents indent on buffer tubes. Conventional similar fiber count designs with less number of fiber per tube has higher cable diameter and weight comparatively. In the other way, weight of material protection considering all layers of cable over optical fibers is comparatively higher to these conventional cables. In turn can be explained as material per fiber kilometer is higher in less number of optical fibers per tube. Further, the air blown optical fiber cables with less number of optical fibers per tube are larger in diameter and heavy in weight. This affects the blowing performance of the air blown optical fiber cables. These air blown optical fiber cables with large diameter and heavy weight cannot be blown for large distances.

In light of the foregoing discussion, there exists a need for an optical fiber cable which overcomes the above cited drawbacks of conventionally known optical fiber cables.

BRIEF SUMMARY OF THE INVENTION

In an aspect, the present disclosure provides an optical fiber cable. The optical fiber cable includes a central strength member. The central strength member lies substantially along a longitudinal axis of the optical fiber cable. The central strength member is characterized by a first diameter. The first diameter of the central strength member is about 3.2 millimeter. The optical fiber cable includes at least one buffer tube. The at least one buffer tube is stranded helically around the central strength member. Each of the at least one buffer tube encapsulates a plurality of optical fiber. A number of the at least one optical fiber in each of the at least one buffer tube is 36. A change in attenuation of each of the at least one optical fiber is about 0.05 decibels per kilometer at a wavelength of 1550 nanometer. The at least one buffer tube is formed of polybutylene terephthalate. The at least one buffer tube is maintained in tension during stranding. The tension maintained during stranding is about 900 to 1000 grams. The at least one buffer tube is stranded around the central strength member by maintaining a negative excess elongation of about 0.01%. Each of the at least one buffer tube is characterized by a second diameter. The second diameter of each of the at least one buffer tube is in a range of about 1.6±0.05 millimeters. Each of the at least one buffer tube is characterized by a third diameter. The third diameter of each of the at least one buffer tube is in a range of about 2.0±0.05 millimeters. Each of the at least one buffer tube is characterized by a first thickness. The first thickness of each of the at least one buffer tube is in a range of about 200 microns ±50 microns. Each of the at least one buffer tube is characterized by a first density. The first density of each of the at least one buffer tube is about 1.31 gram per cubic centimeter. The optical fiber cable includes a first layer. The first layer circumferentially surrounds a core of the optical fiber cable. The first layer is formed of a pair of binder yarns. The pair of binder yarn comprises of a first binder yarn and a second binder yarn. The first binder yarn is wrapped helically in clockwise direction. The second binder yarn is wrapped helically in anti-clockwise direction. The optical fiber cable includes at least one set of water swellable yarn. Each set of the at least one set of water swellable yarn include a plurality of water swellable yarns. The optical fiber cable includes a second layer. The second layer is covering jacket of the optical fiber cable. The second layer circumferentially surrounds the first layer. The second layer is formed of high density polyethylene. The second layer is characterized by a second thickness. The second thickness of the second layer lies in a range of about 0.4 millimeter to 0.6 millimeter. The optical fiber cable includes a plurality of ripcords. The optical fiber cable is characterized by a fourth diameter. The fourth diameter is radial distance between diametrically opposite ends of the optical fiber cable. The fourth diameter of the optical fiber cable is in a range of about 8.0±0.3 millimeters. The optical fiber cable includes 288 optical fibers.

A primary object of the disclosure is to provide an optical fiber cable with multiple buffer tubes.

Another object of the present disclosure is to provide the optical fiber cable having a small diameter.

Yet another object of the present disclosure is to provide the optical fiber cable with reduced cable weight.

Yet another object of the present disclosure is to provide the optical fiber cable for installation in micro-ducts.

Yet another object of the present disclosure is to provide the optical fiber cable for installation in a micro duct having an inner diameter of about 10 millimeter and an outer diameter of about 14 millimeter.

Yet another object of the present disclosure is to provide the optical fiber cable to achieve temperature cycling with standard attenuations by maintaining optimized percentage of excess elongation in core of the optical fiber cable.

In an embodiment of the present disclosure, the at least one buffer tube in the optical fiber cable is 8.

In an embodiment of the present disclosure, the central strength member includes a polyethylene coating.

In an embodiment of the present disclosure, the at least one set of water swellable yarn includes a first set of plurality of water swellable yarns. The first set of plurality of water swellable yarns are helically wrapped around the central strength member.

In an embodiment of the present disclosure, the at least one set of water swellable yarn includes a second set of plurality of water swellable yarns. The second set of plurality of water swellable yarns are helically wrapped around the core region of the optical fiber cable.

In an embodiment of the present disclosure, each of the at least one buffer tube has a lay length in a range of about 95 millimeter to 100 millimeter.

In an embodiment of the present disclosure, the second layer is characterized by a second density. The second density of the second layer is in a range of about 0.90 gram per cubic centimeter to 0.96 gram per cubic centimeter.

In an embodiment of the present disclosure, the optical fiber cable has a coverage factor of about 99%.

In an embodiment of the present disclosure, the optical fiber cable has a buffer tubes packing factor of about 58% to 66%.

In an embodiment of the present disclosure, each of the at least one optical fiber has a diameter of about 200 microns.

In an embodiment of the present disclosure, the optical fiber cable includes a plurality of ripcords. Color of the plurality of ripcords is different from color of the first layer. In addition, color of the plurality of ripcords is different from color of the at least one set of water swellable yarn.

In an embodiment of the present disclosure, the optical fiber cable is blown into a duct having an inner diameter of about 10 millimeter and an outer diameter of about 14 millimeter.

In an embodiment of the present disclosure, the second layer is formed of UV resistant high density polyethylene sheath of color gray RAL 7001, wherein the second layer is characterized according to EN50290-2-24.

In an embodiment of the present disclosure, the second layer is formed by coordination polymerization with the facilitation of Ziegler-Natta.

In an embodiment of the present disclosure, the optical fiber cable possesses dimensions, errors and tolerances as per recommendations of ITU-T G.657/A1. The optical fiber cable possesses dimensions, errors and tolerances as per the recommendations of IECEN 60793-2-50. The maximum core concentricity error of each of the at least one optical fiber is about 0.5 microns.

In an embodiment of the present disclosure, the optical fiber cable consists of the at least one optical fiber. The at least one optical fiber has primary protective composite coating consisting of a double layer of acrylate.

In an embodiment of the present disclosure, the central strength member is formed of fiber reinforced plastic.

In an embodiment of the present disclosure, the optical fiber cable is characterized by a cable weight, wherein the cable weight of the optical fiber cable is in a range of about 58 kilogram per kilometer to 70 kilogram per kilometer.

BRIEF DESCRIPTION OF THE DRAWINGS

For a more complete understanding of the present invention, reference is now made to the following descriptions.

Figure 1:
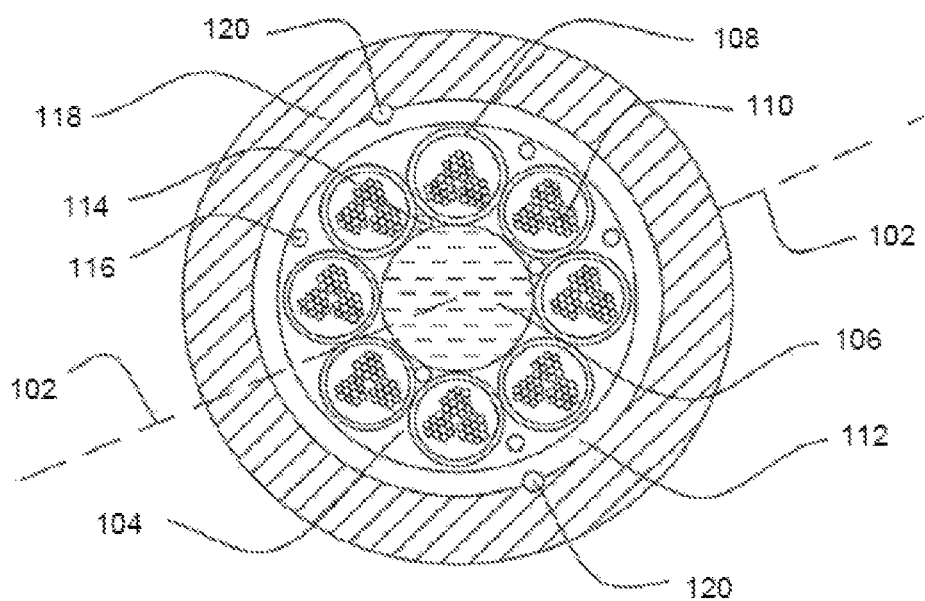
FIG. 1 illustrates a cross sectional view of an optical fiber cable, in accordance with an embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100—The optical fiber cable.
102—The longitudinal axis.
104—The core.
106—The central strength member.
108—Buffer tube.
110—Optical fiber.
112—The first layer.
114—The first set of plurality of water swellable yarns.
116—The second set of plurality of water swellable yarns.
118—The second layer.
120—The plurality of ripcords.
202—The imaginary circle.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross sectional view of an optical fiber cable 100, in accordance with an embodiment of the present disclosure. In general, the optical fiber cable 100 is a network cable that contains strands or array of glass fibers inside an insulated casing. The glass fibers are optical transmission elements and, are used to carry optical signals. The insulated casing facilitates to protect the optical transmissions elements from heat, cold, unwanted disturbances and external interference from other types of wiring. The insulated casing provides protection to the optical fiber cable 100 from ultraviolet rays of sun. The optical fiber cable 100 is designed for long distance transmission of optical signal. The optical fiber cable 100 enables very high speed data transmission. The optical fiber cable 100 transmits data at a higher speed than copper data cable. The optical fiber cable 100 transmits data at much higher bandwidth than copper data cable.

The optical fiber cable 100 is optimized in weight. In general, the lightweight optical cables are employed for duct, aerial and underground installations. The optical fiber cable 100 is used for installation in ducts and micro ducts. The optical fiber cable 100 is specially designed for easy and economical duct installation and underground installation. The optical fiber cable 100 is used for a wide variety of applications. The wide variety of applications includes high speed internet, data transmission, optical sensor, intercommunication, optical circuit installations and the like. The optical fiber cable 100 is very less susceptible to interference. In general, the optical fiber cable 100 is used for installation in ducts and micro ducts. In addition, the optical fiber cable 100 is used for indoor and outdoor applications.

The optical fiber cable 100 is associated with a longitudinal axis 102. The longitudinal axis 102 of the optical fiber cable 100 passes through a geometrical center of the cross section of the optical fiber cable 100. The optical fiber cable 100 is a single mode optical fiber cable. In an embodiment of the present disclosure, the optical fiber cable 100 is a multimode optical cable. In an embodiment of the present disclosure, the optical fiber cable 100 is a 288F micro optical fiber cable. In addition, 288F corresponds to 288 optical fibers. Further, the optical fiber cable 100 has a small diameter which makes the optical fiber cable 100 suitable for installation in micro ducts.

The optical fiber cable 100 is made of a plurality of layers 112 and 118. The plurality of layers 112 and 118 concentrically surrounds a core 104 of the optical fiber cable 100. The plurality of layers 112 and 118 surrounds at least one buffer tube 108. Each of the at least one buffer tube 108 is a loose buffer tube. Each buffer tube 108 of the at least one buffer tube encloses at least one optical fiber. In an embodiment of the present disclosure, the at least one optical fiber is loosely held inside the buffer tubes 108. The optical fiber cable 100 has a reduced diameter. Further, the optical fiber cable 100 has a reduced cable weight (provided below in the patent application).

The optical fiber cable 100 includes a central strength member 106, at least one buffer tube 108 and at least one optical fiber 110. In addition, the optical fiber cable 100 includes a first layer 112, at least one set of water swellable yarn 114, a second layer 118 and a plurality of ripcords 120. The above combination of structural elements enables an improvement in a plurality of characteristics of the optical fiber cable 100. The plurality of characteristics of the optical fiber cable 100 includes but is not limited to optical characteristics, mechanical characteristics, electrical characteristics, transmission characteristics and the like.

The optical fiber cable 100 includes the central strength member 106. The central strength member 106 lies substantially along the longitudinal axis 102 of the optical fiber cable 100. In general, a strength member is used to increase the tensile strength of an optical cable. The central strength member 106 extends substantially along the entire length of the optical fiber cable 100. The central strength member 106 bears forces that are applied on the optical fiber cable 100 during maintenance, installation and regular use. The central strength member 106 prevents the optical fiber cable 100 from damage and increases life span of the optical fiber cable 100. The central strength member 106 provides physical strength to the optical fiber cable 100 and resists over bending of the optical fiber cable 100. In addition, the central strength member 106 provides tensile strength to the optical fiber cable 100. The central strength member 106 provides structural resistance the optical fiber cable 100 against buckling.

The central strength member 106 is circular in cross section. The center of the circular cross section of the central strength member 106 lies substantially on the longitudinal axis 102 of the optical fiber cable 100. In an embodiment of the present disclosure, the central strength member 106 is of any other suitable cross section. The central strength member 106 is characterized by a first diameter. The first diameter is diameter of circular cross section of the central strength member 106. The first diameter of the central strength member 106 is about 3.2 millimeter. In an embodiment of the present disclosure, the central strength member 106 has any other suitable value of the first diameter.

The central strength member 106 is formed of fiber reinforced plastic. In general, fiber reinforced plastic is a composite material having a polymer matrix reinforced with glass fibers. In an example, the fiber reinforced plastics includes but may not be limited to glass fibers, carbon fibers, aramid fibers, basalt fibers and the like. In the embodiment of present disclosure, the central strength member 106 is a solid pultrusion type fiber reinforced plastic. In another embodiment of the present disclosure, the central strength member 106 is made of any other suitable material. The central strength member 106 may be coated circumferentially with a layer of polyethylene. The layer of polyethylene may have any suitable value of radial thickness. In an embodiment of the present disclosure, the central strength member 106 may be coated with any other suitable material. In yet another embodiment of the present disclosure, the central strength member 106 may not be coated.

The optical fiber cable 100 includes the at least one buffer tube 108. In general, buffer tubes meet an optimal requirement of dimensions to facilitate free arrangement of the light transmission elements. The at least one buffer tube 108 provides primary protection to the optical elements. The at least one buffer tube 108 enables good resistance to compressive, tensile and twisting forces and maintains adequate flexibility over a wide range of temperatures. The at least one buffer tube 108 has low moisture sensitivity, good heat resistance, dimensional stability and chemical resistance. The at least one buffer tube 108 form an inner barrier against water penetration and facilitate to isolate the optical transmission element from mechanical forces and thermal stresses.

Each of the at least one buffer tube 108 is a tube for encapsulating the plurality of optical transmission elements. The at least one buffer tube 108 is stranded helically around the central strength member 106. The at least one buffer tube 108 is stranded helically around the central strength member 106. The helical stranding of the at least one buffer tube 108 is formed to maintain a uniform lay length. In general, the lay length is a longitudinal distance along length of the central strength member 106 required for the buffer tubes to complete one turn around the central strength member 106. The at least one buffer tube 108 is characterized by a lay length. The lay length of each of the at least one buffer tube 108 lies in a range of about 95 millimeter to 100 millimeters. In an embodiment of the present disclosure, the lay length of each of the at least one buffer tube 108 lies in any other suitable range of the like.

The cross section of each of the at least one buffer tube 108 is circular in cross section. In an embodiment of the present disclosure, the cross section of each of the at least one buffer tube 108 may be of any suitable shape. Each of the at least one buffer tube 108 has uniform structure and dimensions. Each of the at least one buffer tube 108 is characterized by a second diameter. The second diameter is inner diameter of circular cross section of each of the at least one buffer tube 108. The second diameter of each of the at least one buffer tube 108 lies in a range of about 1.6±0.05 millimeters. In an embodiment of the present disclosure, the second diameter of each of the at least one buffer tube 108 lies in any other suitable range. In addition, each of the at least one buffer tube 108 is characterized by a third diameter. The third diameter is outer diameter of circular cross section of each of the at least one buffer tube 108. The third diameter of each of the at least one buffer tube 108 lies in a range of about 2.0±0.05 millimeters. In an embodiment of the present disclosure, the third diameter of each of the at least one buffer tube 108 lies in any other suitable range.

Further, each of the at least one buffer tube 108 is characterized by a first thickness. The first thickness is radial thickness of each of the at least one buffer tube 108 between the inner surface and outer surface. The first thickness of each of the at least one buffer tube 108 is identical. The first thickness of each of the at least one buffer tube 108 is in a range of about two hundred microns ±50 microns. In an embodiment of the present disclosure, the first thickness of each of the at least one buffer tube 108 lies in any other suitable range of the like. The at least one buffer tube 108 is formed of polybutylene terephthalate. In general, polybutylene terephthalate is a thermoplastic engineering polymer that is used as an insulator. Further, polybutylene terephthalate is resistant to solvents, shrinks little during forming, is mechanically strong, heat-resistant and flame retardant. In an embodiment of the present disclosure, each of the at least one buffer tube 108 is formed of any other suitable material.

Going further, the optical fiber cable 100 includes the at least one optical fiber 110. The at least one optical fiber 110 is encapsulated in the at least one buffer tube 108. Each of the at least one buffer tube 108 encloses at least one optical fiber 110. In general, each of the at least one optical fiber 110 is a light transmission element used for transmitting information as light pulses from one end to another. In addition, each of the at least one optical fiber 110 is a thin strand of glass suitable for transmitting optical signals. Also, each of the at least one optical fiber 110 is configured to transmit large amounts of information over long distances with relatively low attenuation. The at least one optical fiber 110 enables optic fiber communication. In general, optic waveguide communication is a method of transmitting information from one place to another by sending pulses of light through an optical fiber. The light forms an electromagnetic carrier wave that is modulated to carry information. Each of the at least one optical fiber 110 is a single mode optical fiber. In an embodiment of the present disclosure, each of the at least one optical fiber 110 is a multimode optical waveguide.

Each of the at least one optical fiber 110 in the optical fiber cable 100 includes a core region and a cladding region. The core 104 region is an inner part of an optical fiber 110 and the cladding section is an outer part of the optical fiber. Moreover, the core 104 region is defined by a central longitudinal axis of each of the at least one optical fiber 106. In addition, the cladding region surrounds the core 104 region. Each of the at least one optical fiber 110 is characterized by a diameter. The diameter of optical fiber is diameter of cladding section of each of the at least one optical fiber 110. The diameter of each of the at least one optical fiber 110 is about two hundred microns. In an embodiment of the present disclosure, each of the at least one optical fiber 110 has any other suitable value of the diameter.

In addition, the at least one optical fiber 110 is coated with a primary protective composite coating consisting of a double layer of acrylate. The at least one optical fiber 110 has a maximum core 104 concentricity error of about 0.5 microns. The core 104 concentricity error of each of the at least one optical fiber 110 is less than 0.5 microns. In general, core 104 concentricity error corresponds to an error in the relative central position of core 104 region of optical fiber with respect to cladding of optical fiber. The core 104 concentricity error is one of the most important factors affecting the loss of connection between two optical fibers. The value of core 104 concentricity error must be very small to enable smooth optical transmissions. Higher value of core 104 concentricity error corresponds to loss in optical signals. In an embodiment of the present disclosure, the at least one optical fiber 110 has any other suitable value of core 104 concentricity error.

Each of the at least one buffer tube 108 is characterized by a first density. The first density is density of the material of the at least one buffer tube 108. In general, density of a material refers mass per unit volume of the material. The first density of each of the at least one buffer tube 108 is about 1.31 gram per cubic centimeter. In an embodiment of the present disclosure, the first density of each of the at least one buffer tube 108 lies in any other suitable range of the like. Each of the at least one buffer tube 108 encapsulates at least one optical fiber 110. In an embodiment of the present disclosure, the at least one buffer tube 108 is filled with a gel. The gel prevents ingression of water inside each of the at least one buffer tube 108. In an embodiment of the present disclosure, the gel is a thixotropic gel. In another embodiment of the present disclosure, the gel is any other suitable water repellent material of the like. In yet another embodiment of the present disclosure, the at least one buffer tube 108 is dry.

Further, number of at least one buffer tube 108 in the optical fiber cable 100 is eight. In addition, number of at least one optical fiber 110, in each of the at least one buffer tube 108 is thirty six. The optical fiber cable 100 includes eight buffer tubes and each of the eight buffer tubes encapsulates thirty six optical fibers. The optical fiber cable 100 includes a total of 288 (8×36) optical fibers. In an embodiment of the present disclosure, the optical fiber cable 100 includes any suitable number of the at least one buffer tube 108. The at least one buffer tube 108 in the optical fiber cable 100 is colored. The color of each of the at least one buffer tube 108 in the optical fiber cable 100 is different. The color of each of the at least one buffer tube 108 is selected from a group A. The group A includes blue, orange, green, brown, slate, white, red and black. In an embodiment of the present disclosure, the group A includes any suitable colors.

Each of the at least one buffer tube 108 includes three sets of optical fibers. The three sets of optical fibers include a first set of optical fibers, a second set of optical fibers and a third set of optical fibers. Each set of the three sets of optical fiber includes 12 optical fibers. Each of the at least one buffer tube 108 includes a total of thirty six (12×3) optical fibers. The twelve optical fibers in each of the three sets of optical fibers are colored. The color of twelve optical fibers in each of the three sets of optical fibers is different. The twelve colors for the twelve optical fiber in each of the three sets of optical fibers are blue, orange, green, brown, slate, white, red, black, yellow, violet, pink and aqua. The twelve optical fibers in the third set of optical fibers is marked with a double layer strip marking. The twelve optical fibers in the second set of optical fiber is marked with a single layer strip marking. The twelve optical fibers in the first set of optical fibers are unmarked. The optical fiber in each set of optical fibers are colored and marked with strip marking for identification and differentiation. In an embodiment of the present disclosure, the optical fibers in each set of optical fibers are differentiated from one another with the facilitation of any other suitable arrangement of the like.

In an embodiment of the present disclosure, the at least one optical fiber 110 in each of the at least one buffer tube 108 may be arranged in any other suitable pattern of the like. In an embodiment of the present disclosure, the optical fiber cable 100 includes any suitable number of at least one buffer tube 108. In an embodiment of the present disclosure, the optical fiber cable 100 includes any suitable number of at least one optical fiber 110, in each of the at least one buffer tube 108. In an embodiment of the present disclosure, the optical fiber cable 100 includes 432 optical fibers. In another embodiment of the present disclosure, the optical fiber cable 100 includes 576 optical fibers. In yet another embodiment of the present disclosure, the optical fiber cable 100 includes any suitable number of optical fibers. The optical fiber cable 100 has a buffer tube packing factor of about 58-66%. In general, packing factor is defined as ratio of, sum of cross sectional area of at least one optical fiber in a buffer tube to the cross sectional area formed by inner diameter of the buffer tube. In an embodiment of the present disclosure, the buffer tube packing factor of the optical fiber cable 100 lies in any other suitable range of the like.

Figure 2:
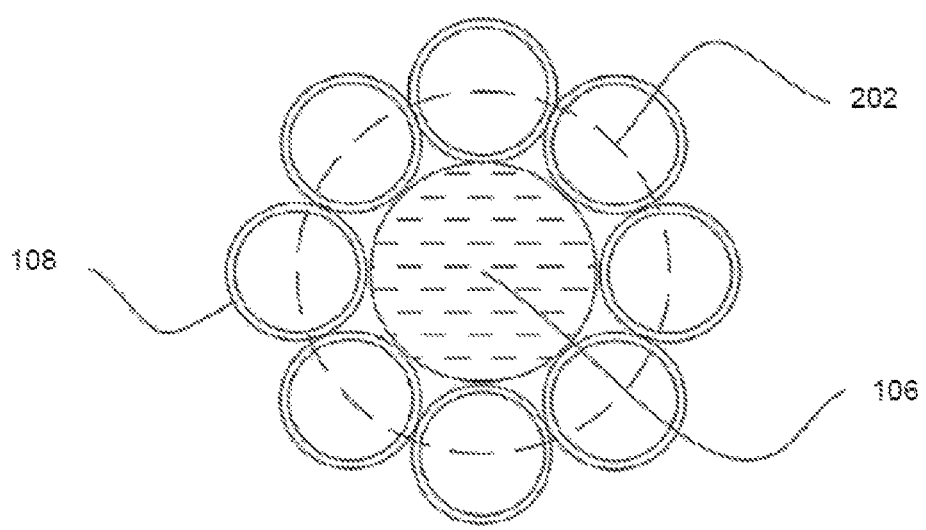
FIG. 2 illustrates a cross sectional view representing an outline of imaginary circle connection the elements of a core of the optical fiber cable.

FIG. 2 illustrates a cross sectional view representing an outline of an imaginary circle 202 connecting the elements of the core 104 of the optical fiber cable 100. The optical fiber cable 100 has a coverage factor of about 99%. In general, coverage factor is defined as ratio of, sum of diameter of buffer tube surrounding the central strength component to circumference of the imaginary circle 202 passing through center of the buffer tubes considering defined lay factor. In an embodiment of the present disclosure, the optical fiber cable 100 has any other suitable value of coverage factor. The at least one buffer tube 108 is maintained intention during stranding. In general, tension refers to a pulling force applied to a body in axial direction with the facilitation of suitable means. In general, stranding of buffer tubes refers to a process where a particular number of buffer tubes are woven together while winding them round common central axis. The at least one buffer tube 108 is stranded with the facilitation of rotation and tension applied in axial direction. The rotation and tension creates winding of the at least one buffer tube 108 around common central axis. The tension maintained during stranding of the at least one buffer tube 108 is about 900 to 1000 grams. In an embodiment of the present disclosure, the at least one buffer tube 108 is maintained at any other suitable tension of the like.

Referring to FIG. 1, the at least one buffer tube 108 of the optical fiber cable 100 is stranded around the central strength member 106 by maintaining negative excess elongation. In general, negative excess elongation facilitates to neutralize effect of negative temperature attenuations in temperature cycling. The excess elongation is defined as difference between percentage elongations of the central strength member 106 minus percentage elongation of the at least one buffer tube 108. The excess elongation is maintained at about −0.01%. In an embodiment of the present disclosure, the excess elongation is maintained at any other suitable value of the like. The excess elongation is achieved or maintained with the facilitation of tension applied during stranding of the at least one buffer tube 108 around the central strength member 106. In order to maintain negative excess elongation, each of the at least one buffer tube 108 is kept under more tension compared to the central strength member 106. The excess elongation is optimized to facilitate in compensating the effect of shrinkage of each of the plurality buffer tubes 108. The excess elongation is optimized before extruding sheath over the core 104 of the optical fiber cable 100.

Each of the at least one optical fiber 110 is characterized by a change in attenuation. In general, fiber attenuation corresponds to a loss in optical power as optical signals travels through an optical fiber. The change in attenuation of each of the at least one optical fiber 110 is about 0.05 decibels per kilometer (hereinafter dB/km) at a wavelength of 1550 nanometer. The change in attenuation of each of the at least one optical fiber 110 is measured in a temperature range of about −40° C. to 70° C. The change in attenuation of each of the at least one optical fiber 110 is measured for two cycles. The temperatures cycling of each of the at least one optical fiber 110 is conducted as per the standards of IEC-60794-1-22, method F1 and GR-20 The apparatus, method, parameters and the like are strictly monitored and maintained according to the guidelines of IEC-60794-1-22. In general, the objective of testing is to analyze ability of a fiber optic cable to mechanically and optically withstand the effects of temperature changes. In an embodiment of the present disclosure, each of the at least one optical fiber 110 has a maximum fiber attenuation of 0.36 dB/km at a wavelength of about 1310 nanometers. In another embodiment of the present disclosure, each of the at least one optical fiber 110 has a maximum fiber attenuation of about 0.26 dB/km at a wavelength of 1625 nanometers.

The optical fiber cable 100 includes the first layer 112. The first layer 112 concentrically surrounds the core 104 of the optical fiber cable 100. The first layer 112 surrounds the at least one buffer tube 108 of the optical fiber cable 100. The first layer 112 extends along the entire length of the optical fiber cable 100. The first layer 112 is formed of a pair of binder yarns. In general, a binder yarn is a material or a substance that holds or draws a plurality of elements together to form a cohesive unit mechanically, by adhesion or cohesion. The pair of binder yarns facilitates in binding together of the optical fiber cable 100. The pair of binder yarn helically wraps the core 104 of the optical fiber cable 100. The pair of binder yarns comprises of a first binder yarn and a second binder yarn. The first binder yarn and the second binder yarn are wrapped helically around the core 104 of the optical fiber cable 100. The first binder yarn is wrapped helically in clockwise direction around the core 104 of the optical fiber cable 100. The second binder yarn is wrapped in anti-clockwise direction around the core 104 of the optical fiber cable 100.

In an embodiment of the present disclosure, the binder yarn is a thread. In another embodiment of the present disclosure, binder yarn is an aramid yarn. In yet another embodiment of the present disclosure, the binder yarn is of any other suitable form of the like. In an embodiment of the present disclosure, the binder yarn is a normal binder yarn. In another embodiment of the present disclosure, the binder yarn is a zero shrinkage binder yarn. In yet another embodiment of the present disclosure, the binder yarn is of any other suitable characteristics of the like.

In addition, the optical fiber cable 100 includes the at least one set of water swellable yarn 114 and 116. Each set of the at least one set of water swellable yarn 114 and 116 includes a plurality of water swellable yarns. The plurality of water swellable yarns 114 and 116 prevents ingression of water and moisture inside the core 104 of the optical fiber cable 100. The at least one set of water swellable yarn 114 and 116 includes a first set of plurality of water swellable yarns 114 and a second set of plurality of water swellable yarns 116. In an embodiment of the present disclosure, the at least one set of water swellable yarn 114 and 116 includes any suitable number of sets of water swellable yarns 114 and 116. The first set of plurality of water swellable yarns 114 is wrapped helically around the central strength member 106. The first set of plurality of water swellable yarns 114 extends along entire length of the optical fiber cable 100. In an embodiment of the present disclosure, the first set of plurality of water swellable yarns 114 is present in any other suitable position in the optical fiber cable 100. The second set of plurality of water swellable yarns 116 is wrapped helically around the core 104 of the optical fiber cable 100. The second set of plurality of water swellable yarns 116 extends along entire length of the optical fiber cable 100. In an embodiment of the present disclosure, the second set of plurality of water swellable yarns 116 is present in any other suitable position in the optical fiber cable 100. In another embodiment of the present disclosure, the second set of plurality of water swellable yarns 116 are replaced by water blocking aramid binder yarns. In yet another embodiment of the present disclosure, the second set of plurality of water swellable yarns 116 are replaced by water blocking rip cords. The water blocking aramid binder yarn and the water blocking ripcord prevent ingression of water and moisture into the core 104 or the optical fiber cable 100.

The optical fiber cable 100 includes the second layer 118. The second layer 118 circumferentially surrounds the first layer 112 of the optical fiber cable 100. The second layer 118 concentrically surrounds the first layer 112 of the optical fiber cable 100. The second layer 118 extends substantially along entire length of the optical fiber cable 100. The second layer 118 is a covering jacket of the optical fiber cable 100. In general, covering jacket is the outermost component of an optical cable. The covering jacket circumferentially covers the first layer 112 of the optical fiber cable 100. The second layer 118 protects the core 104 of optical fiber cables 100 from harsh environment, water, moisture, dust, external radiations, mechanical forces and harmful UV rays. The second layer 118 is characterized by a second thickness. The second thickness of the second layer 118 is the radial thickness between inner surface and outer surface of the second layer 118. The second thickness of the second layer 118 lies in a range of about 0.4 millimeters to 0.6 millimeters. In an embodiment of the present disclosure, the second thickness of the second layer 118 lies in any other suitable range of the like.

The second layer 118 is formed of high density polyethylene. The second layer 118 of high density polyethylene is UV resistant. The second layer 118 is characterized by a second density. The second density is density of the high density polyethylene material of the second layer 118. The second density of the second layer 118 lies in a range of about 0.90 gram per cubic centimeter to 0.96 gram per cubic centimeter. In an embodiment of the present disclosure, the second density of the second layer 118 lies in any other suitable range of the like. The second layer 118 is formed of high density polyethylene by coordination polymerization with the facilitation of Ziegler-Natta polymerization. In general, coordination polymerization is a form of addition in which monomer adds to a growing macromolecule through an organometallic active center. The development of coordination polymerization technique is done with facilitation of heterogeneous catalysts. The second layer 118 is gray in color. The gray color of the second layer 118 is RAL 7001. In general, RAL color system is a system used for information defining standard in colors. RAL is the mostly commonly used color standard for industrial applications. RAL 7001 corresponds to a standard shade of gray color. In an embodiment of the present disclosure, the second layer 118 is formed by any other polymerization method of ethylene. The second layer 118 is polyethylene sheath is UV-resistant high density with characteristics according to EN50290-2-24. The second layer 118 possesses properties, dimensions, errors and tolerances as per the recommendations of EN50290-2-24. In general, EN50290-2-24 describes plurality of geometrical, mechanical and physical attributes of the optical fiber cable 100. In an embodiment of the present disclosure, the second layer 118 is formed of polyethylene. In another embodiment of the present disclosure, the second layer 118 is formed of polyamide. In yet another embodiment of the present disclosure, the second layer 118 is made of any suitable polymer. In yet another embodiment of the present disclosure, the second layer 118 is formed of any other suitable material. In an embodiment of the present disclosure, the second layer 118 may have any other suitable color. In an embodiment of the present disclosure, the second layer 118 may have any other suitable characteristics of the like.

The optical fiber cable 100 includes the plurality of ripcords 120. The plurality of ripcords 120 is positioned underneath the second layer 118. The plurality of ripcords 120 extends substantially long entire length of the optical fiber cable 100. In general, ripcords facilitates in striping of outer sheath of optical cables. The plurality of ripcords 120 facilitates striping of the second layer 118 of the optical fiber cable 100. The plurality of ripcords 120 facilitates striping of the second layer 118 to enable access to the at least one optical fiber 110. The plurality of ripcords 120 is positioned diametrically opposite to one another in pairs of two. In an embodiment of the present disclosure, the plurality of ripcords 120 is placed in any suitable pattern of the like.

In an embodiment of the present disclosure, the plurality of ripcords 120 are formed of twisted yarns. In another embodiment of the present disclosure, the plurality of ripcords 120 a-bis formed of polyester material. In yet another embodiment of the present disclosure, the plurality of ripcords 120 a-bis formed of any other suitable material. In an embodiment of the present disclosure, number of plurality of ripcords 120 a-binthe optical fiber cable 100 is two. In another embodiment of the present disclosure, number of plurality of ripcords 120 a-b may vary. In an embodiment of the present disclosure, the color of plurality of ripcords 120 a-bin the optical fiber cable 100 is different from color of the first layer 112 and the second set of water swellable yarns 116. The color difference facilitates in easy identifications of the plurality of ripcords 120 for stripping of the optical fiber cable 100. In yet another embodiment present disclosure, the plurality of ripcords 120 are replaced by a plurality of yarns with high strength and water blocking ability. The plurality of yarns facilitates access to the at least one optical fiber 110 and prevents ingression of water and moisture inside the core 104 of the optical fiber cable 100.

The optical fiber cable 100 is characterized by a fourth diameter. The fourth diameter is radial distance between diametrically opposite ends of the optical fiber cable 100. The diametrically opposite ends correspond to diametrically opposite outermost surfaces of the optical fiber cable 100. The fourth diameter is outer diameter of the optical fiber cable 100. The fourth diameter of the optical fiber cable 100 lies in a range of about 8±0.3 millimeters. In an embodiment of the present disclosure, the fourth diameter of the optical fiber cable 100 lies in any suitable range of the like. In addition, the optical fiber cable 100 is characterized by a cable weight. The cable weight is weight per kilometer of the optical fiber cable 100. The cable weight of the optical fiber cable 100 lies in a ranger of about fifty eight kilogram per kilometer to seventy kilogram per kilometer. In an embodiment of the present disclosure, the cable weight of the optical fiber cable 100 lies in any other suitable region of the like.

The optical fiber cable 100 has a minimum bend radius for installation and after installation. The minimum bend radius of the optical fiber cable 100 during installation is about twenty times of the fourth diameter of the optical fiber cable 100. The minimum bend radius of the optical fiber cable 100 after installation is about fifteen times of the fourth diameter of the optical fiber cable 100. In an embodiment of the present disclosure, the optical fiber cable 100 has any suitable value of the minimum bend radius. In general, the minimum bend radius is the smallest allowed radius a cable is allowed to be bend around with in which, change in attenuation will be with required standard limits. During installation, optical cables are bent or flexed in various environmental conditions. Optical cables are often bent around a curve in conduits or underground ducts.

The optical fiber cable 100 has a crush resistance. The crush resistance of the optical fiber cable 100 is about 500 Newton per 100 millimeter. In an embodiment of the present disclosure, the optical fiber cable 100 has any suitable value of crush resistance. In general, crush resistance is the ability of an optical cable to withstand and/or recover from the effects of a compressive force. The optical fiber cable 100 can be blown into ducts and microducts. The optical fiber cable 100 can be blown into microducts having inner diameter of about ten millimetres and outer diameter of about fourteen millimetres. In an embodiment of the present disclosure, the optical fiber cable 100 can be blown into microducts of any other suitable size of the like.

The optical fiber cable 100 has an impact strength. The impact strength of the optical fiber cable 100 is about five Newton meter. In an embodiment of the present disclosure, the optical fiber cable 100 has any other suitable value of impact strength. In general, impact strength is the ability of an optical cable to absorb shock and impact energy without damaging cable components & maintaining standard limits of attenuation changes. The optical fiber cable 100 is characterized by a torsion angle. The optical fiber cable 100 can withstand torsion angle up to ±180°. In an embodiment of the present disclosure, the optical fiber cable 100 may has any other suitable value of torsion angle. In general, torsion angle is the twisting of optical cable with certain an applied torque for certain angle within which the change in attenuation will be in required standard limits.

The optical fiber cable 100 is UV resistant. The second layer 118 of the optical fiber cable 100 is formed of UV resistant material. The optical fiber cable 100 is resistant to harmful UV rays of sun. The at least one optical fiber 110 possesses dimensions, errors and tolerances as per the recommendations of ITU-T G.657/A1. In general, ITU-TG.657/A1 describes characteristics of bending-loss insensitive single-mode optical fibers and optical fiber cables for the access network. In general, ITU-T G.657/A1 also describes geometrical, mechanical and transmission attributes of a standard single-mode optical fibers and optical fiber cables. The geometrical, mechanical and transmission attributes of the optical fiber cable 100 are according to the standards of ITU-T G.657/A1. The optical fiber cable 100 possesses dimensions, errors and tolerances as per the recommendations of IEC EN 60793-2-50. In general, IEC EN 60793-2-50 also describes plurality of geometrical, mechanical and transmission attributes of a standard single-mode optical fibers and optical fiber cables. The geometrical, mechanical and transmission attributes of the optical fiber cable 100 are according to the standards of IEC EN 60793-2-50.

The optical fiber cable has numerous advantages over the prior art. The optical fiber cable is easy to installer in small ducts. In addition, the optical fiber cable has a small diameter. Moreover, the optical fiber cable has a reduced weight. The small diameter of the cable enables the easier installation of the optical fiber cable in the small ducts. Further, the small diameter and the reduced weight increases the blowing performance of the micro optical fiber cable. Furthermore, the optical fiber cable is a cable with a single layer construction. The single layer construction enables a decrease in manufacturing time for the optical fiber cable. Also, the single layer construction allows easier access to inner layers of the optical fiber cable during mid-spanning.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fiber cable comprising:
at least one buffer tube, wherein each of the at least one buffer tube encapsulates at least one optical fiber,
a first layer,
wherein the first layer circumferentially surrounds the at least one buffer tube of the optical fiber cable,
wherein the first layer is formed of a pair of binder yarns, wherein the pair of binder yarns comprising:
a first binder yarn, wherein the first binder yarn being wrapped helically in a clockwise direction, and
a second binder yarn, wherein the second binder yarn being wrapped helically in an anti-clockwise direction.

2. The optical fiber cable as claimed in claim 1, wherein each of the at least one buffer tube being characterized by a first thickness, wherein the first thickness of each of the at least one buffer tube is in a range of 200 microns ±50 microns.

3. The optical fiber cable as claimed in claim 1, wherein each of the at least one buffer tube being characterized by a first density, wherein the first density of each of the at least one buffer tube is 1.31 gram per cubic centimeter.

4. The optical fiber cable as claimed in claim 1, wherein a number of the at least one optical fiber in each of the at least one buffer tube is 36.

5. The optical fiber cable as claimed in claim 1, wherein the at least one buffer tube being formed of polybutylene terephthalate.

6. The optical fiber cable as claimed in claim 1, wherein the at least one buffer tube being maintained in tension during stranding, wherein the tension maintained during stranding is 900 to 1000 grams.

7. The optical fiber cable as claimed in claim 1, wherein the at least one buffer tube being stranded around a central strength member by maintaining a negative excess elongation of 0.01%.

8. The optical fiber cable as claimed in claim 1, wherein the at least one buffer tube in the optical fiber cable is 8.

9. The optical fiber cable as claimed in claim 1, wherein each of the at least one buffer tube has a lay length in a range of 95 millimeter to 100 millimeter.

10. The optical fiber cable as claimed in claim 1, comprising at least one or more of:
a second layer, wherein the second layer is a covering jacket of the optical fiber cable, wherein the second layer being formed of high density polyethylene,
the second layer being characterized by a second thickness, wherein the second thickness of the second layer lies in a range of 0.4 millimeter to 0.6 millimeter,
the second layer being characterized by a second density, wherein the second density of the second layer being in a range of 0.90 gram per cubic centimeter to 0.96 gram per cubic centimeter,
the second layer is formed of UV resistant high density polyethylene sheath,
the second layer is formed by coordination polymerization with the facilitation of Ziegler-Natta.

11. The optical fiber cable as claimed in claim 1, wherein the optical fiber cable being characterized by a diameter, wherein the diameter is radial distance between diametrically opposite ends of the optical fiber cable, wherein the diameter of the optical fiber cable is in a range of 8.0±0.3 millimeters, wherein the optical fiber cable has 288 optical fibers.

12. The optical fiber cable as claimed in claim 1, further comprising a central strength member lying substantially along a longitudinal axis of the optical fiber cable, wherein the at least one buffer tube is helically wound around the central strength member.

13. The optical fiber cable as claimed in claim 1, wherein at least one or more of:
a change in attenuation of each of the at least one optical fiber is 0.05 decibels per kilometre at a wavelength of 1550 nanometre,
each of the at least one optical fiber has a diameter of 200 microns,
the maximum core concentricity error of each of the at least one optical fiber is 0.5 microns,
the at least one optical fiber has a primary protective composite coating consisting of a double layer of acrylate.

14. The optical fiber cable as claimed in claim 1, wherein at least one or more of:
a central strength member includes a polyethylene coating,
the central strength member is formed of fiber reinforced plastic.

15. The optical fiber cable as claimed in claim 1, further comprising at least one set of water swellable yarn, wherein each set of the at least one set of water swellable yarn comprising a plurality of water swellable yarns, wherein the at least one set of water swellable yarn includes a first set of plurality of water swellable yarns, wherein the first set of plurality of water swellable yarns being helically wrapped around a central strength member.

16. The optical fiber cable as claimed in claim 1, wherein at least one or more of:
the optical fiber cable has a coverage factor of 99%, the optical fiber cable has a buffer tube packing factor of 58% to 66%,
the optical fiber cable is characterized by a cable weight, wherein the cable weight of the optical fiber cable is in a range of 58 kilogram per kilometre to 70 kilogram per kilometre.

17. The optical fiber cable as claimed in claim 1, wherein the optical fiber cable is blown into a duct having an inner diameter of 10 millimeter and an outer diameter of 14 millimeter.

18. The optical fiber cable as claimed in claim 1, wherein the optical fiber cable includes a plurality of ripcords, wherein a color of the plurality of ripcords is different from a color of the first layer, wherein the color of the plurality of ripcords is different from a color of at least one set of water swellable yarn.

19. The optical fiber cable as claimed in claim 1, further comprising a central strength member lying substantially along a longitudinal axis of the optical fiber cable, wherein the at least one buffer tube being stranded helically around the central strength member, wherein each of the at least one buffer tube being characterized by a second diameter, wherein the second diameter of each of the at least one buffer tube is in a range of 1.6±0.05 millimeters,
wherein each of the at least one buffer tube being characterized by a third diameter, wherein the third diameter of each of the at least one buffer tube is in a range of 2.0±0.05 millimeters.

* * * * *